United States Patent
Hojnowski et al.

[11] Patent Number: 6,053,561
[45] Date of Patent: Apr. 25, 2000

[54] DOOR ASSEMBLY FOR A PICK-UP TRUCK

[75] Inventors: Walter J. Hojnowski, Rochester Hills; Kenneth McClatchey, Macomb Township; Glen M. Kondratek, Sterling Heights; Ernest F. Willoughby, Lake Orion; Philip E. Payne, Northville; Robert J. Janosko, Bloomfield Hills, all of Mich.

[73] Assignee: Chrysler Corporation, Auburn Hills, Mich.

[21] Appl. No.: 09/116,738

[22] Filed: Jul. 16, 1998

[51] Int. Cl.⁷ .......................................................... B60J 1/08
[52] U.S. Cl. ................... 296/146.11; 296/146.9; 296/183
[58] Field of Search .................. 296/183, 146.1, 296/146.5, 146.8, 146.9, 202, 146.11, 190.11; 16/368

[56] References Cited

U.S. PATENT DOCUMENTS

| | | | |
|---|---|---|---|
| 1,676,599 | 7/1928 | Breneman | 296/146.9 |
| 2,116,330 | 5/1938 | Tjaarda | 296/202 |
| 4,348,046 | 9/1982 | Ohya | 296/146.9 |
| 4,405,173 | 9/1983 | Piano | 296/146.9 |
| 4,709,957 | 12/1987 | Ohya | 296/146.3 |
| 4,861,096 | 8/1989 | Hastings | 296/183 |
| 4,930,836 | 6/1990 | Grinn | 296/146.11 |
| 5,288,124 | 2/1994 | Ward | 296/183 |
| 5,306,067 | 4/1994 | Hull et al. | 296/146.9 |
| 5,491,875 | 2/1996 | Siladke et al. | 16/368 |
| 5,752,737 | 5/1998 | Heldt et al. | 296/202 |
| 5,782,523 | 7/1998 | Heldt et al. | 296/146.9 |

Primary Examiner—Joseph D. Pape
Assistant Examiner—Kiran Patel
Attorney, Agent, or Firm—Mark P. Calcaterra

[57] ABSTRACT

An improved door assembly for a motor vehicle, especially a pick-up truck having a rear window, whereby the outer panel of the of the rear door is fabricated to form parts of both the side and rear surfaces of the body portion of the vehicle. An operating clearance needed for opening and closing the rear door assembly is positioned on the rear of the vehicle so as to improve the appearance of the vehicle when the vehicle is viewed from the side. The operating clearance on the rear of the vehicle can be positioned to coincide with the frame of a window set into the body of the vehicle to partially obscure the operating clearance when viewing the vehicle from the rear. With specific reference to a pick-up truck, further obscuring of the operating clearance can be obtained by positioning the operating clearance below the window frame behind the bed of the pick-up truck. A plurality of hinges are used to attach the rear door to the body of the vehicle. The pivot axis of the hinges is positioned outward of the operating clearance and away from the aperture in the cab of the pick-up truck so as to improve ingress to and egress from the cab of the pick-up truck.

22 Claims, 2 Drawing Sheets

DOOR ASSEMBLY FOR A PICK-UP TRUCK

BACKGROUND OF THE INVENTION

1. Technical Field

The present invention generally relates to motor vehicles. More particularly, the present invention relates to a double door construction for a pick-up truck. While not limited thereto, the present invention specifically relates to a double door arrangement for a pick-up truck in which a trailing horizontal edge of a rear door is not visible from a side view of the pick-up truck.

2. Discussion

In a conventional manner, pick-up truck cabs are constructed to include a single door which is pivotally mounted on each side of the vehicle body to permit ingress and egress to seating positions for the driver and passengers of the vehicle. Such doors are hinged adjacent their leading vertical edges. In certain applications, the construction of the pick-up truck cab is modified by extending its length. Such extended cab configurations typically provide a rear seating area for additional vehicle passengers, cargo or both. In the described conventional arrangement including a single door mounted on each side of the vehicle body, ingress and egress to the rear seat is often difficult.

To a more limited extent, it is also known in extended cab configurations to provide a pair of doors on each side of a pick-up truck. For example, U.S. Pat. No. 4,930,836 to Grinn is illustrative of such a use of a double side door construction. The rear door is pivotally mounted to a rear pillar or B-pillar of the pick-up truck. When the rear door is closed, its trailing vertical edge is flush with a lateral side of the cab body.

While known door constructions for motor vehicles, including but not limited to the type shown in U.S. Pat. No. 4,930,836, have proven to be commercially acceptable for specific applications, they are all associated with certain drawbacks. For example, when the door construction of the type shown and described in U.S. Pat. No. 4,930,836 is incorporated into a vehicle, the trailing vertical edge of the rear door is positioned forward of the rear edge of the cab body, as shown most clearly in FIG. 3 of U.S. Pat. No. 4,930,836. This is unattractive, as the operating clearance between the door and the body of the vehicle is clearly visible from a side view, thereby detracting from the overall styling of the vehicle.

SUMMARY OF THE INVENTION

It is a general object of the present invention to provide a door assembly for a pick-up truck which overcomes the deficiencies of the prior art, specifically but not limited to those discussed above.

It is another object of the present invention to provide a door arrangement for a pick-up truck having double-doors in which the operating clearance needed for opening and closing a rear door is positioned such that it is not visible from the side of the vehicle.

It is another object of the present invention to provide a door assembly for a pick-up truck having double-doors in which a portion of the operational clearance for opening the door is positioned to coincide with the substantially vertical portion of a window frame set into the rear surface of the pick-up truck cab so as to obscure the placement of the operational clearance when the cab is viewed laterally.

It is another object of the present invention to position the pivot axis of the hinges outward of the operating clearance and away from the aperture in the cab of the pick-up truck so as to improve ingress to and egress from the cab of the pick-up truck.

In one form, the present invention provides a door assembly for a motor vehicle having a body with a transversely extending side and a longitudinally extending side. The body further includes a rear pillar position at the intersection between the laterally extending side and the longitudinally extending side. The door assembly includes a door proper position forward of the rear pillar and pivotally attached to the rear pillar for movement between a closed position and an open position. The door proper includes an outer panel rearwardly extending beyond the rear pillar.

In another form, the present invention provides a pick-up truck including a cab having a rear pillar, first and second lateral sides and a rear side including a window and a window frame. The pick-up truck further includes a rear door attached to the rear pillar for pivotal movement about a pivot axis between a closed position and an opened position. The rear door has an outer panel including a side portion which is flushed with the lateral side of the cab when the rear door is in the closed position and a rear portion substantially perpendicular to the side portion and substantially coplanar with the rear surface of the body. The pick-up truck further includes an operating space located between the rear side and the rear portion of the outer panel for facilitating the opening and closing of the rear door. The operating space is positioned to coincide with a substantially vertical side of the window frame so that the operating space is obscured when the cab is viewed from the rear.

DETAILED DESCRIPTION OF THE PREFERRED EMBODIMENT

Figure 1:
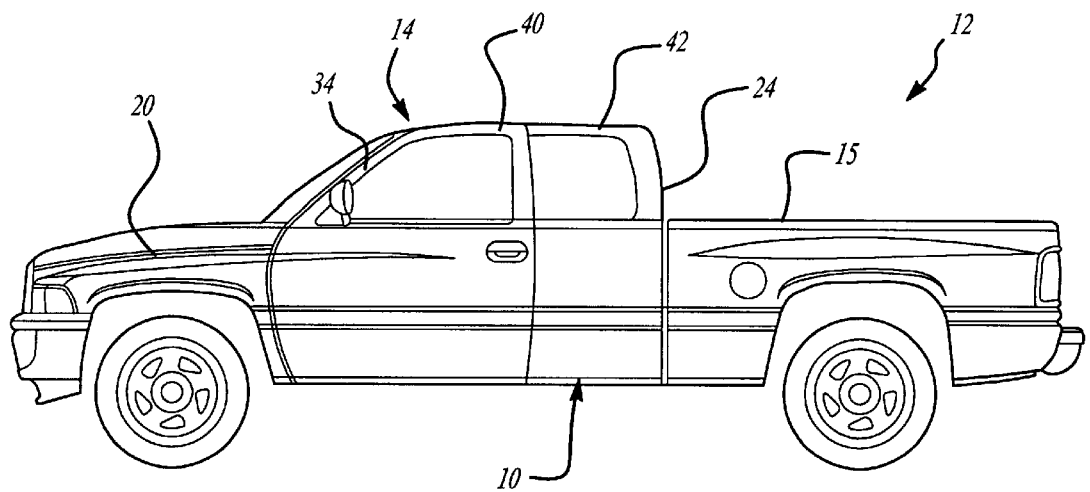
FIG. 1 is a perspective view of a pickup truck incorporating a door assembly constructed in accordance with the teachings of a preferred embodiment of the present invention.

With general reference to FIGS. 1 through 4 of the drawings, a door assembly constructed in accordance with the teachings of the preferred embodiment of the present invention is generally identified with reference numeral 10. In the exemplary application illustrated, the door assembly 10 is shown operatively associated with a pick-up truck 12 having an extended cab 14 and a load box portion or bed 15. It will be understood that the particular vehicle 12 shown is merely exemplary and that the teachings of the present invention are applicable for a wide range of motor vehicles. It will also be understood that while the remainder of this detailed description of the preferred embodiment will be primarily directed to the door assembly 10 on the driver's side of the cab 14, the other side of the cab 14 includes a door assembly 10 which is preferably symmetrically constructed.

The cab portion 14 of the pick-up truck 12 is of the extended type in which a rear area, indicated generally at 16, is included behind the normal forward seating position 18 of the driver. The cab portion 14 of the pick-up truck 12 is comprised of first and second longitudinally extending sides 20 and 22 and a rear side 24 which extends transversely. The rear side is shown to include a rear window 26 set into a window frame 28. As specifically shown in FIG. 4, rear pillars or B-pillars 30 are conventionally employed to strengthen the intersections between the lateral sides 20 and 22 and the rear side 24. The cab portion 14 is opened by a continuous aperture 32 extending longitudinally from a front pillar structure or A-pillar 34 to the B-pillar and vertically from a floor 36 to a roof 38 of the cab portion 14.

As shown throughout the drawings, the door assembly 10 of the present invention is shown to generally include a front door 40 and a rear door 42. The front and rear doors 40 and 42 are swingably mounted on the cab body 14 to move between positions opening and closing the continuous aperture 32. The front door 40 is preferably a conventional vehicle front door swingable mounted on a lower portion of the A-pillar through conventional hinges 43. The front door 40 may include a movable window and carries at its trailing edge a latch assembly (not shown). The latch assembly will be understood to be conventionally locked, latched and unlatched through mechanisms well known in the automotive body arts. As will become apparent below, the primary focus of the present invention relates to the rear door 42 and specifically to attachment of the rear door 42 to the cab portion 14 of the pick-up truck 12.

The rear door 42 is swingably mounted on the B-pillar 30 through a pair of 25 spaced hinge assemblies 44. The hinge assemblies 44 are substantially identical and may be of the type most specifically illustrated in FIG. 4. Each of the hinge assemblies 44 is illustrated to include first and second hinge elements 46 and 48 operatively connected for relative pivotal movement about a pivot axis. The first hinge element 46 is welded or otherwise fixedly secured to the rear pillar 30. The second hinge element 48 is welded or otherwise fixedly secured to an inner panel 52 of the rear door 42. In the preferred embodiment, the first hinge element 46 is secured to a surface 54 of the rear pillar 30 which is oriented substantially transverse to the longitudinal axis of the vehicle 12, while the second hinge element 48 is secured to a surface 56 of the inner panel 52 substantially parallel to the longitudinal axis. In the preferred embodiment, reinforcement plates 58 and 59 are provided to reinforce the B-pillar 30 and inner panel 52, respectively.

Figure 2:
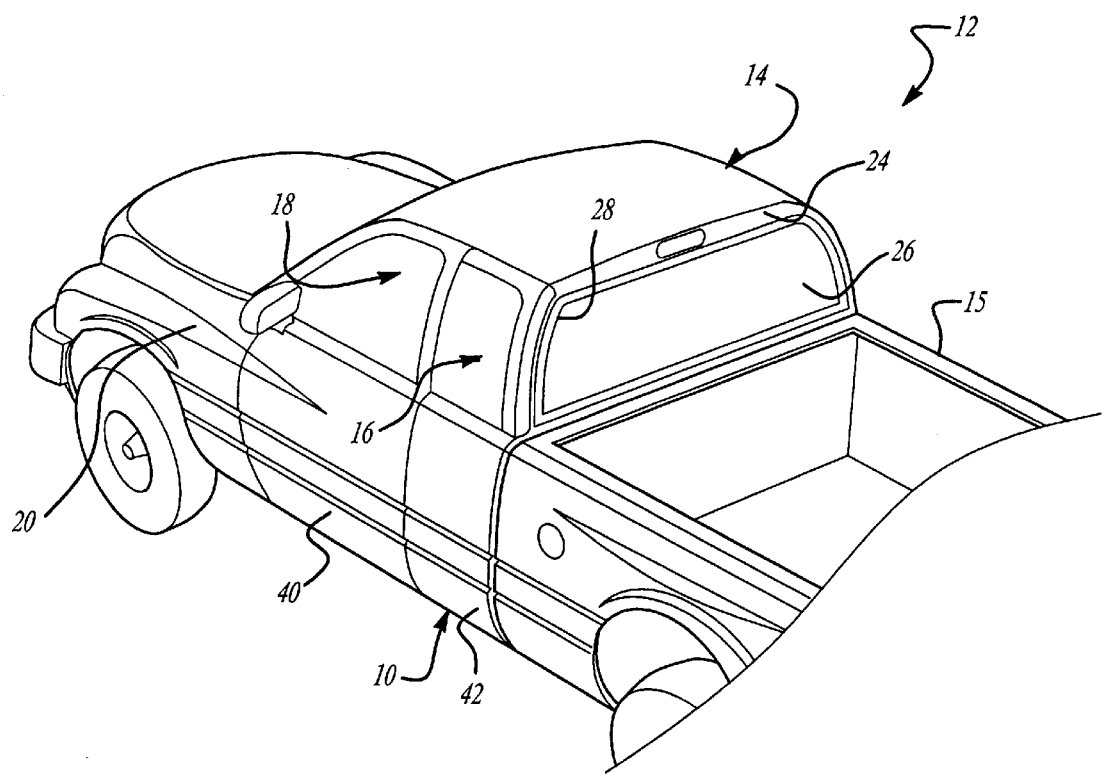
FIG. 2 is a perspective view of a portion of the pickup truck of FIG. 1 illustrated with a rear door of the door assembly of the preferred embodiment of the present invention pivoted to a closed position.
Figure 3:
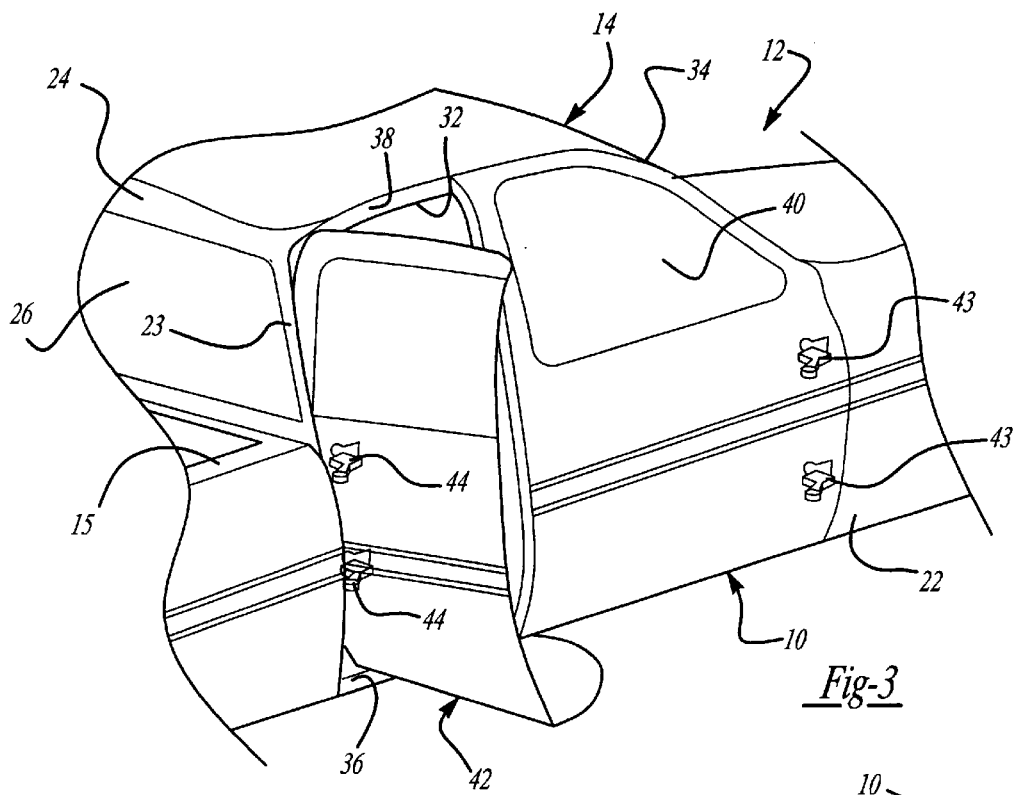
FIG. 3 is another perspective view of the pickup truck of FIG. 1 illustrated with the rear door of the door assembly of the preferred embodiment of the present invention pivoted to a partially open position.
Figure 4:
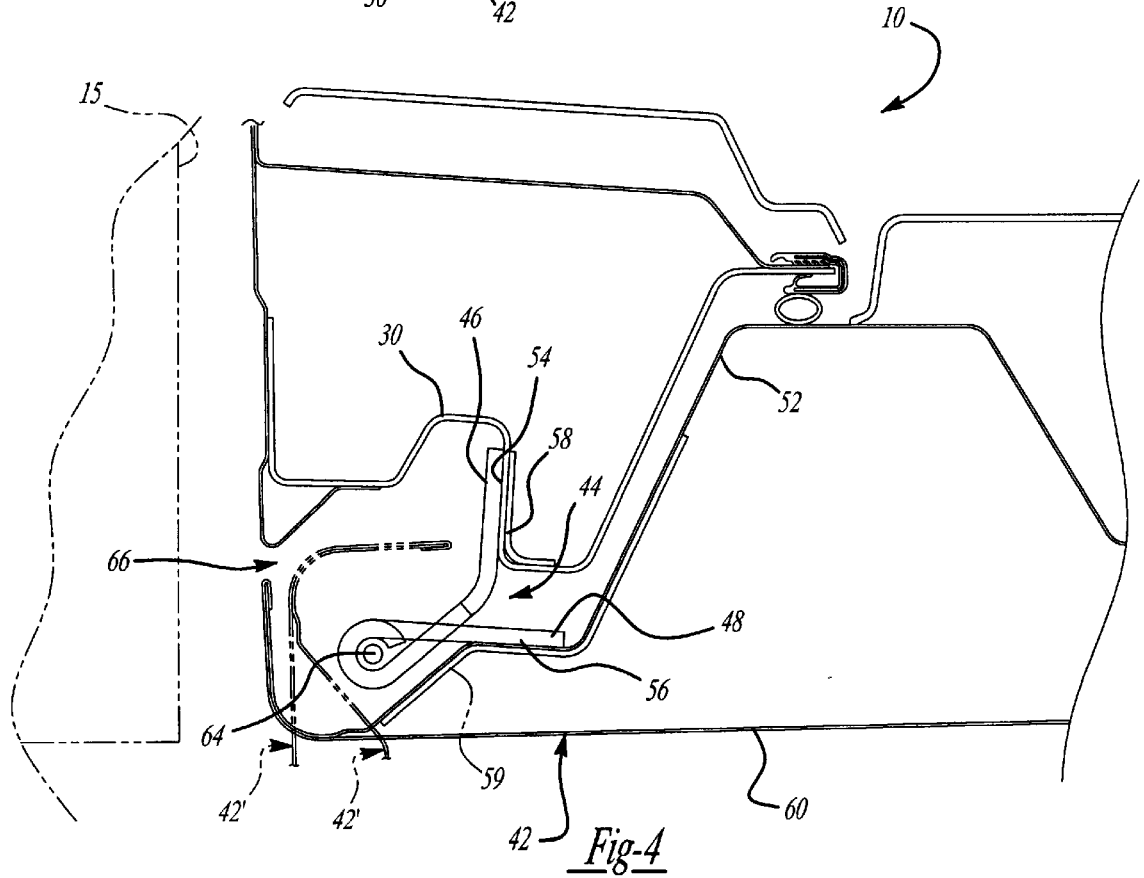
FIG. 4 is a cross-sectional view taken through a lower hinge connecting the rear door to the B-pillar of the pick-up truck, illustrating in phantom a portion of the rear door when pivoted to an open position.

The hinge elements 46 and 48 allow the rear door 42 to pivot between an open position as shown in FIG. 3, and a closed position, as shown in FIGS. 1 & 2. The open position is also shown in FIG. 4 in solid lines. Phantom lines identified as 42' and 42" illustrate the rear door 42 in an intermediate position and the open position, respectively.

Referring specifically to FIG. 4, when the rear door 42 is articulated to its closed position, as indicated by the solid lines, an outer panel 60 of the rear door 42 is oriented flush with the adjacent lateral side 20 of the cab 14 and extends longitudinally from the front door 40 toward the rear of the cab 14 to form a side portion of the outer panel 60. In the preferred embodiment, the side portion of the outer panel 60 extends rearwardly beyond the B-pillar 30.

At the rear of the cab 14, the outer panel 60 turns laterally inboard in an orientation substantially perpendicular to the side portion of the outer panel 60 and co-planar with the rear side 24 of the cab 14, forming a rear portion of the outer panel 60. The rear portion of the outer panel 60 preferably extends inwardly beyond a pivot axis 64 of the hinge assemblies 46 and 48 and terminates at an edge 66, thereby concealing the hinge assemblies 46 and 48 when the pick-up truck 12 is viewed from the rear.

Wrapping of the outer panel 60 of the rear door 42 around to the rear surface 22 of the cab 14 displaces an operating clearance 60 needed for opening and closing the rear door 42 to the rear of the cab 14, thus minimizing the negative visual impact of the operating clearance 66. When viewing the cab 14 from the rear, the negative visual impact of the operating clearance 66 is minimized by positioning the operating clearance 66 so that it coincides with the frame 28 of the rear window 26 as shown in FIG. 2. At elevations below the window frame 28. In addition, the operating clearance 66 extends vertically downward from the lower corner of the window frame 28 and is effectively obscured by the bed 15 of the pick-up truck 12. In addition, wrapping of the outer panel 50 around the end of the cab 14 also allows the hinge assemblies 46 and 48 to be set back from the opening 32 in the cab 14 so that the rear door panel 42 can swing completely away from the opening to thereby provide better access to the cab 14. Setting the hinge assemblies 46 and 48 back from the opening also minimizes the potential for passengers or cargo to encounter the hinge mechanisms 46 and 48.

While the present invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. A door assembly in combination with a motor vehicle having a body with a transversely extending side and a longitudinally extending side, the body further including a rear pillar positioned at the intersection between the laterally extending side and the longitudinally extending side, the door assembly comprising:

a door proper extending forward of the rear pillar and pivotally attached to the rear pillar for movement between a closed position and an open position about a fixed pivot axis, said door proper including an outer panel having a rear portion and a side portion, said rear portion laterally extending inward beyond said pivot axis when said door proper is in said closed position, said a side portion being flush with said transversely extending side when said door proper is in said closed position, and said rear portion being substantially co-planar with said longitudinally extending side when said door proper is in said closed position.

2. The door assembly of claim 1, further including a hinge assembly interconnecting said door proper and said rear pillar, said hinge assembly having first and second hinge elements, said first hinge element fixedly interconnected to said door proper, said second hinge element fixedly interconnected to the rear pillar and pivotally attached to said first hinge element.

3. The door assembly of claim 2, wherein said rear side of said outer panel is adapted to laterally extend in an inboard direction beyond said pivot axis.

4. The door assembly of claim 2, wherein said first hinge element is attached to an inner panel of said door proper.

5. The door assembly of claim 4, wherein said first hinge element is attached to a surface of said inner panel which is substantially parallel to a longitudinal axis of the motor vehicle.

6. The door assembly of claim 5, wherein said second hinge element is attached to a surface of said rear pillar which is substantially perpendicular to the longitudinal axis of the motor vehicle.

7. A pick-up truck comprising:
   a cab having a rear side, a rear pillar, and a lateral side; and
   a door positioned forward of the rear pillar and pivotally attached to the rear pillar for movement between a closed position and an open position, said door including an outer panel attached to said rear pillar for pivotal movement about a fixed pivot axis between a closed position and an open position, said door having an outer panel including a side portion which is flush with the lateral side of said cab when said door is in said closed position and a rear portion substantially perpendicular to said side portion, said rear portion substantially co-planar with the rear surface of said cab.

8. The pick-up truck of claim 7, wherein said outer panel has a side portion and a rear portion substantially perpendicular to said side portion, said side portion adapted to be positioned flush with the longitudinally extending side of the motor vehicle and said rear side adapted to be positioned substantially co-planar with the rear side of the cab when said door is in said closed position.

9. The pick-up truck of claim 8, wherein said rear portion of said outer panel inwardly extends beyond said pivot axis.

10. The pick-up truck of claim 9, further including a hinge assembly having first and second hinge elements, said first hinge element fixedly interconnected to said door, said second hinge element fixedly interconnected to the rear pillar and pivotally attached to said first hinge element.

11. The pick-up truck of claim 10, wherein said door includes an inner panel and further wherein said first hinge element is attached to a surface of said inner panel which is oriented substantially parallel to a longitudinal axis of the pick-up truck when the door is rotated to said closed position.

12. The pick-up truck of claim 11, wherein said second hinge element is attached to a service of said rear pillar which is substantially perpendicular to the longitudinal axis of the pick-up truck.

13. A pick-up truck comprising:
   a cab having a rear pillar, first and second lateral sides, and a rear side including a window and a window frame;
   a front door;
   a rear door pivotally attached to said rear pillar for pivotal movement about a fixed pivot axis between a closed position and an open position, said rear door having an outer panel including a side portion which is flush with the lateral side of said cab when said rear door is in said closed position and a rear portion substantially perpendicular to said side portion and substantially co-planar with the rear side of said cab; and
   said rear side and said rear portion of said outer panel defining an operating space therebetween for facilitating the opening and closing of said rear door.

14. The pick-up truck of claim 13, wherein said operating space positioned to coincide with a substantially vertical side of said window frame so that said operating space is obscured when said cab is viewed from the rear.

15. The pick-up truck of claim 13, further comprised of a truck bed having a front surface positioned in close proximity to said rear side of said cab.

16. The pick-up truck of claim 13, further comprising a hinge assembly interconnecting said rear door and said rear pillar, said hinge assembly having first and second hinge elements, said first hinge element fixedly interconnected to said rear door, said second hinge element fixedly interconnected to said rear pillar and pivotally attached to said first hinge element.

17. The pick-up truck of claim 10, wherein said rear door includes an inner panel, and further wherein said first hinge element is attached to said inner panel.

18. The pick-up truck of claim 17, wherein said first hinge element is attached to a service of said inner panel which is substantially parallel to said first and second laterally sides.

19. The pick-up truck of claim 18, wherein said second hinge element is attached to a service of said rear pillar which is substantially perpendicular to said first and second laterally sides.

20. The door assembly of claim 2, wherein said second element of said hinge assembly is fixedly attached to a rearward facing surface of said rear pillar.

21. The pick-up truck of claim 10, wherein said second element of said hinge assembly is fixedly attached to a rearward facing surface of said rear pillar.

22. The pick-up truck of claim 16, wherein said second element of said hinge assembly is fixedly attached to a rearward facing surface of said rear pillar.

* * * * *